United States Patent [19]

Fleck et al.

[11] 3,899,487

[45] Aug. 12, 1975

[54] PHENYLSTILBENE TRIAZOLE COMPOUNDS

[75] Inventors: Fritz Fleck, Bottmingen, Basel, Switzerland; Alec Victor Mercer, Leeds; Roger Paver, Bradford, both of England; Horst Schmid, Munchenstein, Basel, Switzerland

[73] Assignee: Sandoz Ltd., Basel, Switzerland

[22] Filed: Dec. 12, 1972

[21] Appl. No.: 314,333

[30] Foreign Application Priority Data
Dec. 17, 1971 Switzerland............ 18433/71

[52] U.S. Cl............ 260/240 C; 106/137; 106/176; 117/33.5 R; 117/33.5 T; 117/139.4; 117/139.5 R; 252/94; 252/301.2 W; 252/543; 260/308 A; 260/465 E; 260/471 R; 260/505 R; 260/515 R; 260/556 AR; 260/558 R
[51] Int. Cl............................................ C09b 23/00
[58] Field of Search ................. 260/240 C, 240 CA

[56] References Cited
UNITED STATES PATENTS

| | | | |
|---|---|---|---|
| 3,453,268 | 7/1969 | Dorlars et al. | 260/240 C |
| 3,579,511 | 5/1971 | Weber et al. | 260/240 C |
| 3,708,475 | 1/1973 | Kirchmayr | 260/240 C |

FOREIGN PATENTS OR APPLICATIONS

| | | | |
|---|---|---|---|
| 7,008,642 | 7/1970 | Netherlands | 260/240 C |
| 7,008,643 | 7/1970 | Netherlands | 260/240 C |

*Primary Examiner*—John D. Randolph
*Attorney, Agent, or Firm*—Gerald D. Sharkin; Richard E. Vila; Joseph J. Borovian

[57] ABSTRACT

Phenylstilbene triazole compounds, chloro-substituted on the triazole ring, e.g.

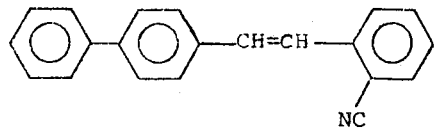

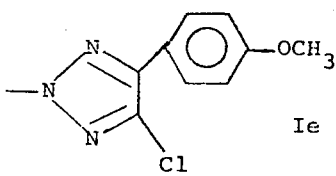

Ie are useful optical brighteners.

12 Claims, No Drawings

NEW PHENYLSTILBENE TRIAZOLE COMPOUNDS

The present invention relates to new phenylstilbene triazole derivatives.

The invention provides compounds of formula I,

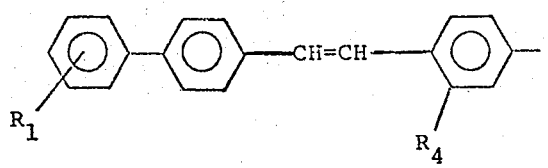

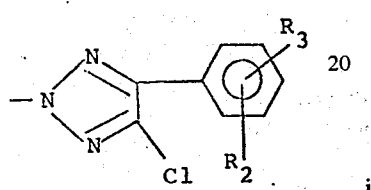

I in which
- $R_1$ signifies hydrogen, phenyl or the —$SO_3M$ group, in which M signifies the equivalent of a cation,
- $R_2$ signifies hydrogen, nitrile, fluorine, chlorine, alkyl or alkoxy of 1 to 5 carbon atoms which may be substituted by hydroxyl, alkoxy of 1 to 4 carbon atoms, phenyl or phenoxy, or —COOM, —$SO_3M$, in which M is as defined above, —CONR'R'' or $SO_2NR'R''$, in which R' and R'' each signifies hydrogen or alkyl of 1 to 4 carbon atoms,
- $R_3$ signifies hydrogen, nitrile, fluorine, chlorine, alkyl or alkoxy of 1 to 5 carbon atoms which may be substituted by hydroxyl, alkoxy with 1 to 4 carbon atoms, phenyl or phenoxy, or phenyl which may be substituted by fluorine, chlorine, alkyl or alkoxy of 1 to 5 carbon atoms, cyano or the —$SO_3M$ group, in which M is as defined above, or —CONR'R'' or —$SO_2NR'R''$ in which R' and R'' are as defined above, and
- $R_4$ signifies hydrogen, nitrile or one of the groups —COOM, —$SO_3M$, in which M is as defined above, —CONR'R'' or —$SO_2NR'R''$, in which R' and R'' are as defined above.

The invention also provides a process for the production of compounds of formula I, which comprises a. chlorination and reduction or treatment with hydrogen chloride of a triazole-N-oxide compound of formula II,

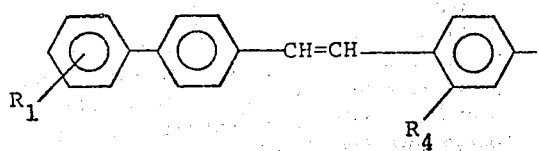

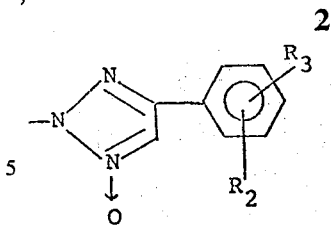

II in which $R_1$, $R_2$, $R_3$ and $R_4$ are as defined above, b. reacting a compound of formula III,

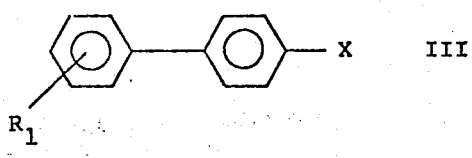

III in which
- $R_1$ is as defined above, and
- X signifies a —CHO group or a functional derivative thereof, with a compound of formula IV,

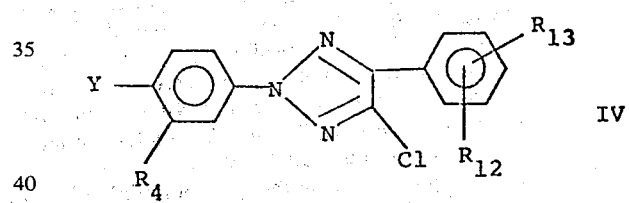

IV in which
- $R_4$ is as defined above,
- Y signifies —$CH_3$ or one of the following groups

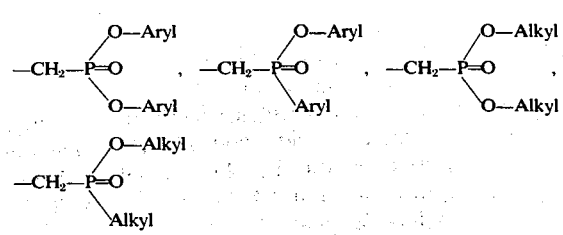

or —$CH_2$—$P^+(Aryl)_3$ Anion$^-$, and
- $R_{12}$ and $R_{13}$ have the same significance as $R_2$ and $R_3$ as defined above, respectively, but may not signify an alkyl or substituted alkyl group, to produce a compound of formula Ia,

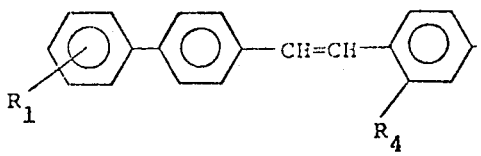

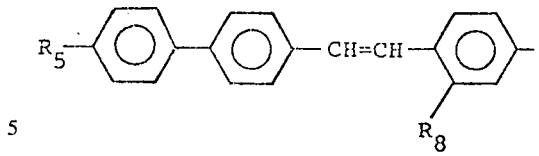

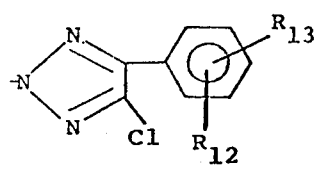

Ia

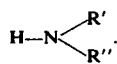

Ib in which $R_1$, $R_4$, $R_{12}$ and $R_{13}$ are as defined above.

It is to be understood that, after preparation of the basic structure of the molecule, one substituent may be replaced by another.

When $R_2$ or $R_3$ is optionally substituted alkyl or alkoxy, they may be, for example, methyl, ethyl, isopropyl, n-propyl, n-butyl, iso-butyl, sec. butyl, tert. butyl, n-amyl, isoamyl, tert. amyl, 2-hydroxyethyl, 2- or 3-hydroxypropyl, 2-methoxyethyl, 2-ethoxyethyl, 2-n-butoxyethyl, 3-methoxypropyl, benzyl, 2-phenylethyl, 2-phenoxyethyl, methoxy, ethoxy, iso-propoxy, n-propoxy, iso-butoxy, 2-hydroxyethoxy, 2- or 3-hydroxypropoxy, 2-methoxyethoxy, 2-ethoxyethoxy, 2-n-butoxyethoxy, 3-methoxypropoxy, benzyloxy, 2-phenylethoxy, 2-phenoxyethoxy; the alkyl and alkoxy groups are, however, preferably unsubstituted.

When $R_3$ is optionally substituted phenyl, it may be, for example, phenyl, 2-, 3- and 4-methylphenyl, 2-, 3- and 4-chlorophenyl, 2,4- and 2,5-dichlorophenyl, 2- or 4-methoxy- and ethoxyphenyl, 2,4- and 2,5-dimethylphenyl, 2-methoxy-5-methylphenyl, 4-ethyl, 4-iso-propyl, 4-tert. butyl, 4-n-butyl and 4-tert. amyl-phenyl, 4-bromo-, 4-fluoro- and 4-cyano-phenyl, 3- and 4-sulphophenyl; unsubstituted phenyl, however, is preferred.

When $R_2$, $R_3$ or $R_4$ is an amidated carboxylic acid or sulphonic acid group, it may be either unsubstituted carboxylic or sulphonic acid amide groups or the amides derived from primary or secondary amines of formula $$H-N\begin{matrix}R'\\R''\end{matrix}$$

Examples of such amines are methylamine, ethylamine, iso-propylamine, propylamine, n-butylamine, dimethylamine, diethylamine and N-methyl-N-ethylamine. The carboxylic and sulphonic acid amide groups are, however, preferably unsubstituted.

In formula I, M denotes an equivalent of any cation of common occurence in anionic optical brightening agents and it may be, for example, hydrogen, an alkali metal (lithium, sodium, potassium), an alkaline-earth metal (magnesium, calcium) or an unsubstituted or substituted ammonium (monoethanol ammonium, diethanol ammonium, triethanol ammonium etc.). Sodium, however, is the most economic cation.

The preferred compounds of formula I are compounds of formula Ib, in which $R_5$ signifies hydrogen, phenyl or the —$SO_3M$ group as defined above, preferably hydrogen or phenyl, $R_6$ signifies hydrogen, chlorine, nitrile, alkyl of 1 to 5 carbon atoms, alkoxy of 1 to 5 carbon atoms (preferably methoxy), or one of the groups —$SO_3M$ as defined above or —$CONH_2$, $R_7$ signifies hydrogen, chlorine, nitrile, alkyl of 1 to 5 carbon atoms, alkoxy of 1 to 5 carbon atoms (preferably methoxy), or one of the groups —$SO_3M$ as defined above, or —$CONH_2$, and $R_8$ signifies hydrogen, nitrile or one of the groups —$SO_3M$ as defined above, or —$CONH_2$.

Compounds of formula Ib in which $R_5$ and $R_6$ signify hydrogen, $R_7$ signifies hydrogen, chlorine, nitrile or methoxy and $R_8$ signifies nitrile or the —$SO_3M$ as defined above group, are specially preferred.

The triazole-N-oxide compounds of formula II may be converted into the corresponding 5-chlorotriazole derivatives of formula I in analogy with known methods. The triazole-N-oxide compound can either be chlorinated to the chlorotriazole-N-oxide compound and this reduced to the chlorotriazole compound, or the triazole-N-oxide compound can be converted into the corresponding chlorotriazole compound by treatment with hydrogen chloride, which is the preferred procedure.

Chlorination can be effected, for example, in a solvent suitable for halogenation reactions with a polar chlorinating agent, for example sulphonyl chloride, thionyl chloride, phosphorus oxychloride. The resulting product can be reduced, for example, with zinc dust/acetic acid or with zinc dust/ethanol.

When the compound of formula II is treated with hydrogen chloride, this is preferably carried out in the presence of an alcoholic or ether-like solvent such as ethanol, propanol, butanol, methyl glycol, ethyl glycol, ethylene glycol, diethylene glycol or dioxan, suitably at 70° to 250°C or preferably at temperatures close to the boiling point of the solvent.

The conversion of the methyl group in compounds of formula XII into the corresponding phosphorus-containing groupings is carried out in accordance with the known methods, for example by halogenation, preferably bromination, and treatment of the halomethyl derivative with a suitable ester of phosphorous acid or of aryl phosphinic or alkylphosphinic acids or with a triarylphosphine. The "alkyl" groups are preferably those suitable as substituents $R_2$ or $R_3$, and aryl is preferably mono-nuclear aryl, especially those phenyl radicals suitable as a substituent $R_3$.

The reaction of a compound of formula III with a compound of formula IV (a Wittig synthesis or an analogous reaction) may be carried out in accordance with conventional methods and preferably in the presence of a suitable catalyst, for example boric acid, zinc chloride, arylsulphonic acids, alkali or alkaline-earth salts of arylsulphonamides, acetic anhydride, alkali acetates, piperidine, alkali or alkaline-earth hydroxides, alkali or alkaline-earth alcoholates, suitably at temperatures of 0° to 200°C, preferably at 20° to 160°C.

The reaction can be accomplished by melting the reactants but it is preferable to work with an inert solvent, for example, with aliphatic or aromatic, preferably halogenated, hydrocarbons, alcohols, ethers, glycols, amides such as formamide, dimethylformamide or dimethylacetamide, N-methylpyrrolidone, phosphoric acid tris-(dimethylamide), acetonitrile, dimethyl sulphoxide or tetramethylene sulphone.

The compounds of formula I may be isolated by the normal methods, for example by filtration with suction if in suspension, by precipitation with a suitable agent and filtration, by evaporation of the solvent and filtration with suction of the separated product etc.

The compounds of formula II may be produced by oxidative cyclization of a hydrazonoxime of formula VI,

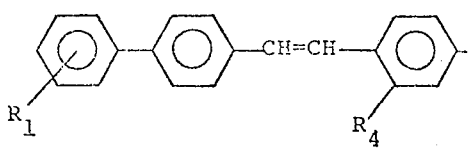

in which $R_1$ to $R_4$ are as defined above, which can be obtained by condensation of the hydrazine compound of formula VII,

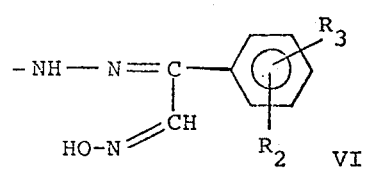

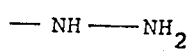

VII in which $R_1$ and $R_4$ are as defined above, with an oximino ketone of formula VIII,

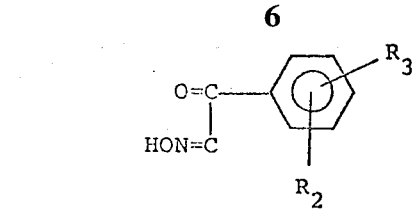

VIII in which $R_2$ and $R_3$ are as defined above.

The compounds of formula IV may, for example, be formed by condensation of a hydrazine compound of formula IX,

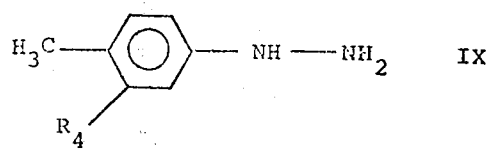

IX in which $R_4$ is as defined above, with an oximino ketone of formula X,

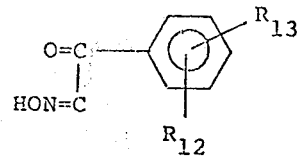

X in which $R_{12}$ and $R_{13}$ are as defined above, with subsequent oxidative ring closure to the corresponding triazole-N-oxide compound of formula XI,

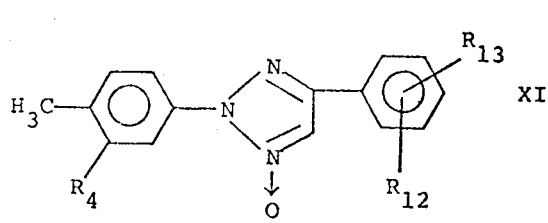

XI in which $R_4$, $R_{12}$ and $R_{13}$ are as defined above, followed by its conversion into a compound of formula XII,

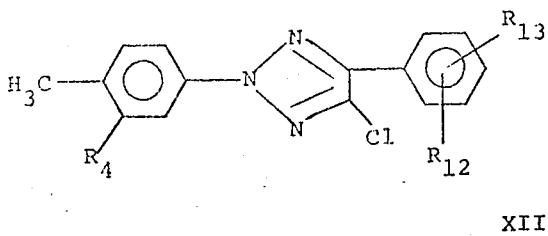

XII in which $R_4$, $R_{12}$ and $R_{13}$ are as defined above, and, when required, transformation of the methyl group into a methylene phosphonium or methylene phosphonic acid ester group.

The compounds of formulae III, VII, VIII, IX and X may be produced by conventional methods or in analogy with conventional methods.

The reaction of hydrazine compounds of formulae VII and IX with oximino ketones of formula VIII or X, respectively, and the subsequent oxidative ring closure, may be carried out in conventional manner.

The reaction of the hydrazine compounds with the oximino ketones can be carried out effectively in water or in an inert organic, preferably polar solvent, for example in alcohols, ethers, glycols, amides such as formamide, dimethylformamide or dimethyl acetamide, phosphoric acid-tris-(dimethylamide), N-methylpyrrolidone, sulphoxides or sulphones such as dimethylsulphoxide or tetramethylene sulphone, or in acetonitrile or a lower alkane-carboxylic acid such as acetic or propionic acid. It is preferred to react in the temperature range of 0° to 150°C, more preferably at 60° to 100°C, in the presence of an acid, preferably an organic lower carboxylic acid such as formic, acetic, propionic, butyric, oxalic, tartaric, lactic or citric acid, for periods ranging from 30 minutes to approximately 12 hours.

On completion of the reaction, the intermediate is suitably isolated, for example by filtration if it is present in suspension, by precipitation with a suitable agent and filtration, or by evaporation or steam distillation of the solvent and filtration, on which it is dried.

Oxidative cyclization of the oximino hydrazones thus formed, can be carried out effectively in the presence of a suitable oxidation-stable solvent; examples of such solvents are water, amides such as dimethyl sulphonamide, dimethyl acetamide, phosphoric acid-tris-(dimethylamide), sulphones such as tetramethylene sulphone, ethers such as dioxan, 1,2-dimethoxy- or 1,2-diethoxy-ethane, tertiary amines such as dimethylaminobenzene and diethylaminobenzene, triethylamine, tri-(n-butyl)-amine, pyridine, picoline, quinoline and mixtures of pyridine bases. Examples of suitable oxidizing agents are bichromate, hydrogen peroxide, alkali hypohalogenites, preferably sodium hypochlorite or hypobromite, inorganic or organic copper (II) compounds such as copper (II) chloride, sulphate, acetate, carbonate or naphthenate, preferably in the presence of nitrogeneous bases such as ammonia, amines such as trimethylamine, ethanolamine, diethanolamine, triethanolamine, pyridine, or in air or oxygen in the presence of catalytic amounts of a copper (II) compound, for example approximately 3 to 10% of the stoichiometric amount of such copper compound. The reaction is preferably carried out at temperatures from 0° to 150°C, more preferably at room temperature to 40°C in the case of alkali hypohalogenites or at 80° to 130°C in the case of oxidation with a copper compound alone or with oxygen or air in the presence of a copper (II) compound.

The compounds of formula I are normally virtually colourless to pale yellow in colour and in solution they fluoresce with a red-violet to blue shade in ultra-violet radiation. These compounds are indicated as being suitable for the optical brightening of organic high polymeric materials and plastics of the most varied type. By "organic high polymeric materials" are understood natural fibres such as cotton and wool, and more importantly, synthetic fibre-forming, unmodified or modified polymers such as polyesters, polyamides, polyurethanes, polyolefins (polyethylene, polypropylene, basic modified polypropylene) polyvinyl acetate, polyvinyl chloride, polyacrylonitrile, modified polyacrylonitrile, polystyrene, cellulose diacetate and cellulose triacetate.

The new compounds can be applied by any of the normal methods for optical brighteners, for example in the form of solutions in water or organic solvents or as aqueous dispersions. They can also be incorporated in spinning solutions and melts, in materials for injection moulding and in the monomers or prepolymers prior to synthesis of the final polymer.

The amounts used may range from 0.001 to 0.5% or preferably 0.01 to 0.2% based on the substrate depending on the method of application and the material for brightening. The disclosed compounds are suitable for use alone or in combination with other brighteners and in the presence of finishing agents, for example softeners, antistatic and crease resistant agents, of surface-active agents such as detergents, of carriers, and in the presence of chemical bleaching agents.

When polyester fibres are to be brightened in the form of fabric, it is of special advantage to apply the phenylstilbenyltriazole compound by a padding process from an aqueous medium containing a surface-active agent and to fix it by dry heat treatment, preferably at 150° to 240°C. The new optical brightening agents give reddish to bluish optical white effects which generally are ver fast to light. They have generally high heat resistance and generally very good affinity for the substrates, are largely stable to chlorite and hypochlorite and are of high yield.

Compounds of formula I in which one or more of the radicals $R_1$, $R_3$ and $R_4$ signifies —$SO_3M_1$ where $M_1$ is sodium or potassium are indicated as being suitable for the optical brightening of cotton, wool and synthetic polyamide fibres.

Compounds of formula I free from sulphonic acid groups are indicated as being suitable for brightening polyesters, polyvinyl chloride, polyolefins, polyacrylonitrile, polystyrene, and cellulose acetates.

In the following Examples the parts and percentages, unless otherwise stated, are by weight and the temperatures in degrees Centigrade. The melting points are uncorrected. The parts by volume relate to the parts by weight of millilitres to grams.

EXAMPLE 1

44.2 Parts of hydrazone oxime of formula VI in which $R_1$, $R_2$ and $R_3$ signify H and $R_4$ signifies CN, are dissolved in 300 parts of pyridine at 90° to 100°. A solution of $CuSO_4.5 H_2O$ in pyridine (37.5 parts of copper (II) sulphate pentahydrate in 100 parts of water and 40 parts of pyridine) is added dropwise in one hour. The reaction mixture is held for 4 hours at 95° to 100°. Subsequently it is cooled to room temperature on which yellow crystals settle out, which are isolated by filtration, washed with some cold methanol and crystallized from dimethylformamide.

The yellow triazole-N-oxide of formula II thus obtained, in which $R_1$, $R_2$ and $R_3$ signify H and $R_4$ signifies CN, is added to a mixture of 1200 parts of dioxan and 150 parts of water. The temperature is raised to 110° with vigorous stirring, then a powerful current of hydrogen chloride gas is directed into the reaction mixture for 4 hours. The triazole-N-oxide goes gradually into solution and well formed, pale yellow crystals settle out. The crystals are filtered with suction, washed with methanol, recrystallized from chlorobenzene with the aid of bleaching earth and dried at 80° under vacuum. Melting point 197°–199°, absorption maximum wavelength in $CHCl_3$: 365 nm.

The compound shows violet-blue fluorescence in chlorobenzene and has the formula Ic,

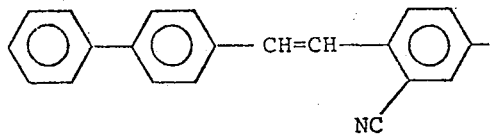
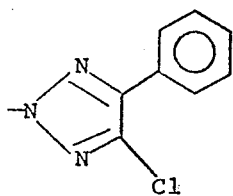

Ic

The hydrazonoxime of formula VI in which $R_1$, $R_2$ and $R_3$ signify H and $R_4$ signifies CN is obtained by adding 22.4 parts of α-oximino acetophenone in portions to a suspension of 46.7 parts of 4-hydrazino-2-cyano-4'-phenylstilbene in a mixture of 1200 parts of methanol, 50 parts of dimethylformamide and 300 parts of 50% acetic acid at 30°–40° and reacting the mixture for 4 hours at 50° C with stirring. After cooling, filtration with suction and vacuum drying at 60°C, the hydrazonoxime is obtained in the form of orange-yellow crystals.

EXAMPLE 2

7 Parts of 2-[4'-diethoxyphosphonomethyl-3'-cyanobenzene]-4-p-chlorophenyl-L5-chloro-vic-triazole and 3 parts of p-phenylbenzaldehyde are dissolved in 30 parts by volume of anhydrous dimethylformamide at 40° with stirring. In 15 minutes, 4 parts by volume of a methanolic sodium methylate solution (equivalent to 1.22 parts of sodium methylate) are dropped in with stirring unitl just before an overall red coloration of the reaction mixture appears. Stirring is continued for 30 minutes at room temperature, after which the reaction mixture is cooled to 10° and the yellow precipitate isolated by filtration. It is washed with some methanol, recrystallized from chlorobenzene (1:100) and vacuum dried at 70°. Pale yellow crystals are obtained in 70% yield with melting point at 235°–236°. This compound is of formula Id,

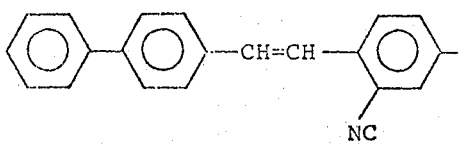
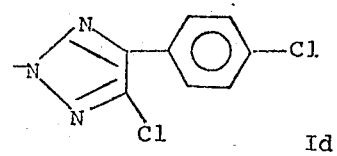

Id and shows violet-blue fluorescence in chlorobenzene solution. Absorption maximum wavelength in chloroform: 369 nm, $\epsilon: 6.1 \times 10^4$.

The diethoxyphosphonomethyl starting compound of formula IV in which Y is $-CH_2-PO(OC_2H_5)_2$, $R_{12}$ is H, $R_{13}$ is p-Cl and $R_4$ is CN is produced as follows. 12 Parts of 3-cyano-4tolylhydrazine are dissolved at 30° in 25 parts by volume of dimethylformamide. 30 Parts by volume of 50% acetic acid are added, followed by 15 parts of p-chlorisonitroso-acetophenone which is added in portions at 20° in the course of 1 hour. The mixture is reacted for 2 hours at 60° with stirring, cooled to 10°, and the yellow oxime hydrazone, melting point 224°–227°, isolated by filtration with suction. It is dissolved in 90 parts of pyridine with heating at 80°–90°, then a solution of 25 parts of copper sulphate in 55 parts of water is added dropwise in 45 minutes with stirring. After subsequent cooling, the pale brown triazole-N-oxide is washed with 100 parts by volume of dioxan and with 50 parts of water and dried with vacuum at 40°. On recrystallization from dimethylformamide its melting point is 248°–249°.

The triazole-N-oxide thus obtained is dissolved in 1000 parts by volume of dioxan and 100 parts of water with heating. Hydrogen chloride gas is directed into the solution for 5 hours with stirring. After cooling to 20° the precipitated reaction product is filtered with suction. White crystals, melting point 172°–173° from dimethylforamide. The product is dissolved in 400 parts by volume of carbon tetrachloride dried over phosphorus pentoxide. 5 Parts of N-bromosuccinimide and 0.15 parts of benzoylperoxide are added. The reaction solution is held at the boil for 6 hours with reflux, cooled to room temperature, filtered, and the filtrate evaporated to dryness. The residue is added to 40 parts of triethyl phosphite and heated for 2 hours at the refluxing temperature. The excess triethyl phosphite is removed by vacuum distillation to leave as residue a compound of formula XV,

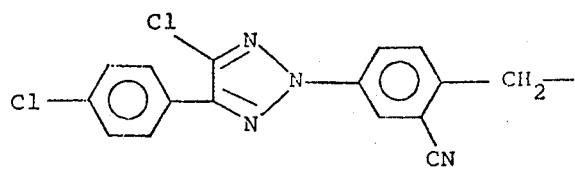
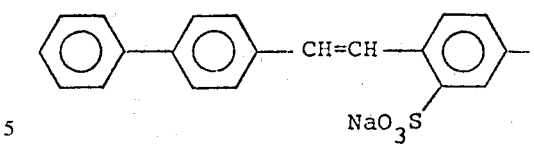

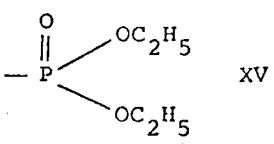 XV

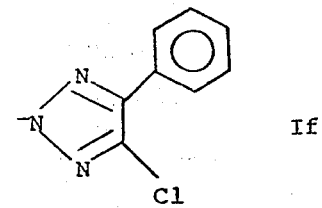 If with melting point 130°–134°.

The compound of formula Ie,

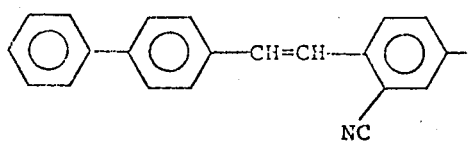

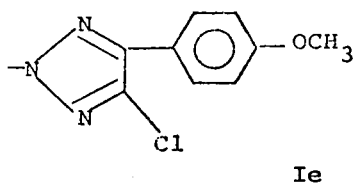

Ie melting point 183°–184°, absorption maximum wavelength in CHCl₃:376 nm, can be produced analogy with the procedure of Example 1 or Example 2.

EXAMPLE 3

51 Parts of the sodium salt of the oxime hydrazone of formula VI in which $R_1$, $R_2$ and $R_3$ signify H and $R_4$ signifies SO₃H are thoroughly mixed with 120 parts of water and 350 parts of pyridine, with heating to 80°. In 30 minutes a solution of copper sulphate pentahydrate (40 parts of copper sulphate pentahydrate, 100 parts water, 40 parts pyridine) is allowed to flow into the mixture. Subsequently the mixture is reacted for 3 hours 30 minutes with reflux. It is then cooled to 80°–90°, a solution of 20 parts of sodium hydroxide in 60 parts of water is added, and the pyridine distilled wit the aid of water vapour until the temperature of the distillate at the head of the column reaches 100°. 60 Parts of water are added to the residue and after cooling to 20° the triazole-N-oxide is filtered with vigorous suction. The orange-coloured product is washed with a little cold water and dispersed in a mixture of 1400 parts of dioxan and 200 parts of water. The dispersion is raised to the refluxing temperature and held at this temperature for 4 hours while a powerful current of hydrogen chloride gas is introduced. Subsequently it is cooled to 15° and the sulphonic acid filtered, washed with water until free of acid and stirred into a mixture of 40 parts of sodium hydroxide and 120 parts of water at 50°. After cooling to 10° the pale yellow sodium salt is filtered. It shows intense blue-violet fluoroscence in aqueous-alcoholic solution and has the structural formula If,

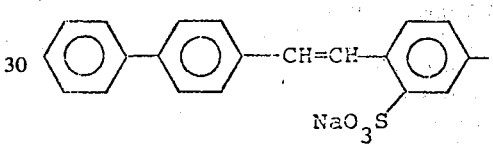

(absorption maximum wavelength in dimethylformamide: 355 nm).

The sodium salt of the oximehydrazone of formula VI in which $R_1$, $R_2$ and $R_3$ signify H and $R_4$ signifies SO₃H can be produced according to the method described in the published German Patent Application No. 1,917,740.

The following compounds can be produced in accordance with the above procedure:

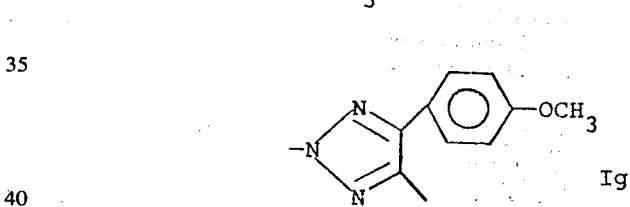

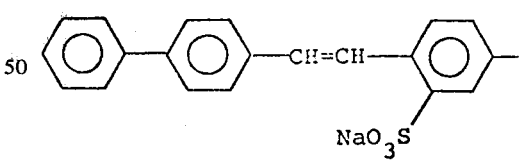 Ig (absorption maximum wavelength in dimethylformamide: 360 nm) and

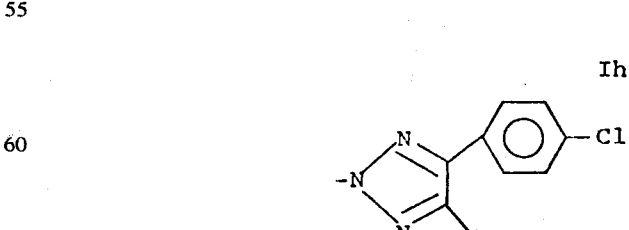

Ih (absorption maximum wavelength in methanol: 350 nm).

The following table details further copounds of formula Ib. These compounds can be produced in accordance with the procedures of the above Examples and are distinguished in the tables by the significance of the substituents $R_5$, $R_6$, $R_7$ and $R_8$ and the fluorescence shade of their solutions.

Table

| Example | $R_5$ | $R_6$ | $R_7$ | $R_8$ | Solution | Fluorescence shade |
|---|---|---|---|---|---|---|
| 4 | H | H | H | H | chlorobenzene | red-violet |
| 5 | H | H | —CONH₂ | H | dimethyl formamide | do. |
| 6 | H | H | —Cl | H | chlorobenzene | do. |
| 7 | H | H | —CH₃ | H | do. | do. |
| 8 | H | —CN | H | H | do. | violet |
| 9 | H | H | —CN | H | do. | blue-violet |
| 10 | H | H | do. | —CN | do. | blue |
| 11 | H | H | —CONH₂ | do. | dimethyl formamide | blue-violet |
| 12 | H | H | —C(CH₃)₃ | do. | chlorobenzene | violet |
| 13 | H | H | —OCH₃ | —CONH₂ | dimethyl formamide | blue-violet |
| 14 | H | H | —CN | —Cl | chlorobenzene | violet |
| 15 | H | H | —SO₃Na | —CN | H₂O/C₂H₅OH 1:1 | do. |
| 16 | —SO₃Na | H | H | —CN | H₂O/C₂H₅OH 1:1 | violet |
| 17 | do. | —SO₃Na | H | do. | do. | blue-violet |
| 18 | H | do. | H | —SO₃Na | do. | violet |
| 19 | H | H | —CH₃ | do. | do. | do. |
| 20 | —SO₃Na | H | —OCH₃ | do. | do. | blue |
| 21 | —C₆H₅ | H | H | —CN | chlorobenzene | violet |

APPLICATION EXAMPLE A

Five parts of a white fabric of "Banlon" polyamide 66 yarn are scoured in an aqueous solution of 250 parts containing 1 part of a powder detergent based on sodium dodecylbenzenesulphonate and 0.008 parts of the brightener of formula If (in solution in 2-ethoxyethanol). The polyamide fabric is entered into the scouring bath at 40°, the bath raised to 70° in 15 minutes and the fabric treated for 30 minutes at this temperature. On removal it is thoroughly rinsed with coled demineralized water and dried at 60°. In comparison with untreated fabric, the treated polyamide fabric exhibits an optical brightening effect of brilliant reddish shade.

A suitable scouring agent, exclusive of the moisture and water of crystallization, has the following composition:

20 – 30 % sodium dodecyl benzenesulphonate
10 – 20 % sodium tripolyphosphate
50 – 70 % sodium sulphate If the 0.008 parts of the brightener of formula If employed in this Example are replaced by the equivalent amount of the brightener of formula Ig, a brilliant neutral blue brightening effect is obtained.

APPLICATION EXAMPLE B

Five parts of a cotton fabric are washed once to 5 times, each time for 15 minutes at 50°, in a bath of 200 parts of water set with 1 part of a powder detergent, 0.0015 parts of one of the brighteners of formula If, Ig or Ih or of Examples 4 to 21, and 0.02 parts of available chlorine in the form of sodium hypochlorite. After the treatment, the fabric is thoroughly rinsed with a 2 g/l aqueous solution of sodium thiosulphate and then with cold demineralized water and finally dried at 80°. In comparison with untreated cotton, the treated cotton fabric shows a brilliant optical brightening effect with a shade varying from reddish to bluish according to the brightener used.

A suitable scouring agent, exclusive of the moisture and water of crystallization, has the following composition:

25 % sodium dodecyl benzenesulphonate
35 % sodium tripolyphosphate
10 % sodium silicate
29 % sodium sulphate
1 % carboxymethyl cellulose

APPLICATION EXAMPLE C

Five parts of a fabric of "Banlon" polyamide 66 yarn are entered at 40° into 200 parts of an aqueous solution containing 0.01 part of the optical brightener of formula Ih and 0.4 parts of sodium chlorite which has been acidified with a small amount of formic acid and buffered to pH 3.5. The solution is raised to 90°–95° in 30 minutes and held at this temperature for 1 hour. On removal the fabric is thoroughly rinsed with a 2 g/l solution of sodium thiosulphate and then with cold demineralized water and dried at 80°. In comparison with untreated fabric the treated fabric shows a brilliant reddish brightening effect.

APPLICATION EXAMPLE D

The procedure of Application Example A is employed using, however, 2.5 parts of a bleached, mercerized cotton fabric and 2.5 parts of a white fabric of Banlon polyamide 66 yarn. After rinsing with cold demineralized water and drying at 80°, the two fabrics show a brilliant reddish optical brightening effect.

APPLICATION EXAMPLE E

In a mixture of 250 parts by volume of trichlorethylene and 250 parts by volume of chlorobenzene containing in solution 0.2 parts of the optical brightener of formula Ic, 50 parts of polyester fabric are treated for a short time with constant agitation to simulate dry cleaning. The excess solvent is extracted by centrifuging to leave the fabric with about 100 % solvent content. The fabric is dried at 60° with vacuum and then treated for 15 minutes with water vapour at 120°-130°. The treated polyester fabric shows a higher degree of whiteness than a comparable fabric which has been dry cleaned in the same way without the addition of the optical brightener. If a blend fabric of polyester fibre and cotton is employed in this Example in place of the polyester/cotton fabric, an equally effective improvement in the degree of whiteness is obtained.

APPLICATION EXAMPLE F

100 Parts of polyester fibre are treated at 90°-95° for 1 hour 30 minutes in a bath of 3000 parts of water containing 6 parts of formic acid 85 %, 6 parts of sodium chlorite 80 %, 5 parts of a carrier and 2 parts of a 10 % aqueous dispersion of one of the brighteners of formulae Id, Ie, Ig and Ih. On removal the fabric is washed off, rinsed and dried. It shows a higher degree of whiteness than a comparable fabric bleached under the same conditions but without the addition of the optical brightener.

APPLICATION EXAMPLE G

In a melt spinning machine 200 parts of polyethylene terephthalate are melted at 280° in a nitrogen atmosphere. 0.04 Parts of the compound of formula Id are added, which melts at this temperature and is stirred in the polyester until it is homogeneously distributed. Four parts of titanium dioxide are added as delustring agent, with continuous stirring for homogeneous mixing. The melt is extruded through a spinning nozzle and the filament chilled by a water jet, cold drawn and wound on bobbins.

Products made of the filament show a considerably high degree of whiteness than products of filament produced without the addition of the brightening agent.

If the compound of formula If is used in place of the compound of formula Id, a comparable white effect is obtained.

APPLICATION EXAMPLE H

A fabric of polyethylene terephthalate fibre is padded at room temperature with an aqueous dispersion containing per litre 0.1 to 0.6 grams of one of the compounds of formula Ic, Id or Ie or of Examples 4 to 14 or 21, and 1 part of an adduct of about 8 mols of ethylene oxide on 1 mol of p-tert. octylphenol. The expression on the padding machine leaves the fabric containing 80 % of its weight of liquid. It is dried for 30 minutes at 60° and then treated in dry heat at 130° to 220° for a few seconds to 1 minute depending on the temperature. The fabric is of considerably whiter appearance than a comparable untreated fabric.

If a blend fabric, for example of polyester fibre and cotton, is used in this Example in place of a 100 % polyester fabric, a comparable degree of whiteness is obtained.

What we claim is:
1. A compound of the formula,

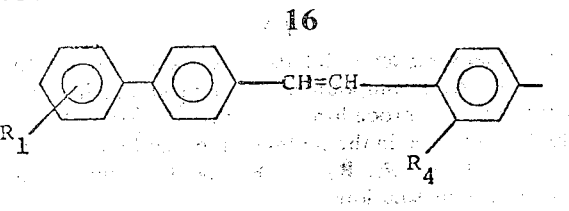

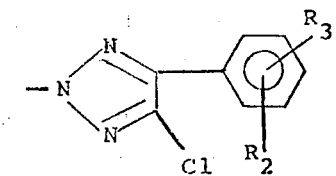

I in which
$R_1$ signifies hydrogen, phenyl or the $-SO_3M$ group, in which M signifies the equivalent of a cation;
$R_2$ signifies hydrogen, nitrile, fluorine, chlorine, alkyl or alkoxy of 1 to 5 carbon atoms which may be substituted by hydroxyl, alkoxy of 1 to 4 carbon atoms; phenyl or phenoxy; or $-COOM$ or $-SO_3M$, in which M is as defined above, $-CONR'R''$ or $SO_2NR'R''$, in which $R'$ and $R''$ each signifies hydrogen or alkyl of 1 to 4 carbon atoms;
$R_3$ signifies hydrogen; nitrile, fluorine, chlorine, alkyl or alkoxy of 1 to 5 carbon atoms which may be substituted by hydroxyl, alkoxy with 1 to 4 carbon atoms; phenyl or phenoxy, or phenyl which may be substituted by fluorine, chlorine, alkyl or alkoxy of 1 to 5 carbon atoms; cyano or the $-SO_3M$ group, in which M is as defined above, or $-CONR'R''$ or $-SO_2NR'R''$ in which $R'$ and $R''$ are as defined above; and
$R_4$ signifies hydrogen, nitrile; one of the groups $-COOM$; $-SO_3M$; in which M is as defined above, $-CONR'R''$ or $-SO_2NR'R''$, in which $R'$ and $R''$ are as defined above.

2. A compound according to claim 1, in which $R_2$ signifies hydrogen, nitrile, fluorine, chlorine or unsubstituted alkyl or alkoxy of 1 to 5 carbon atoms, $R_3$ signifies hydrogen, nitrile, fluorine, chlorine, unsubstituted alkyl or alkoxy of 1 to 5 carbon atoms, unsubstituted phenyl, and $R_4$ signifies hydrogen, nitrile, $-COOM$ or $-SO_3M$ in which M is as defined in claim 1, $-CONH_2$ or $-SO_2NH_2$, and $R_1$ is as defined in claim 1.

3. A compound of the formula,

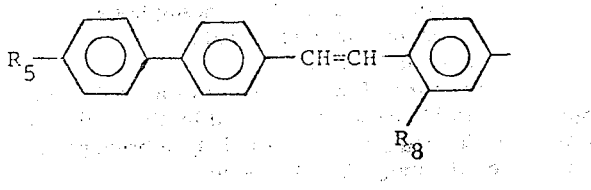

Ib'

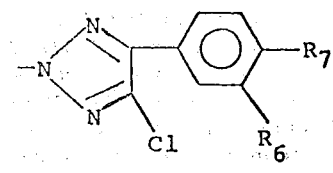

in which
R₅ signifies hydrogen or phenyl,
R₆ signifies hydrogen, chlorine, nitrile, unsubstituted alkyl of 1 to 5 carbon atoms, methoxy, —SO₃M, in which M is an equivalent of a cation, or —CONH₂,
R₇ signifies hydrogen, chlorine, nitrile, unsubstituted alkyl of 1 to 5 carbon atoms, methoxy, —SO₃M in which M is as defined above, or —CONH₂, and
R₈ signifies hydrogen, nitrile, —SO₃M, in which M is as defined above, or —CONH₂.

4. A compound according to claim 1, in which R₁ is hydrogen, R₂ is hydrogen, R₃ is chlorine, methoxy or hydrogen and R₄ is nitrile or —SO₃M in which M is as defined therein.

5. A compound according to claim 1, of the formula,

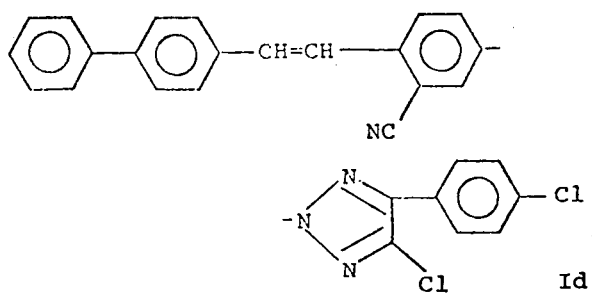

Id

6. A compound according to claim 1, of the formula,

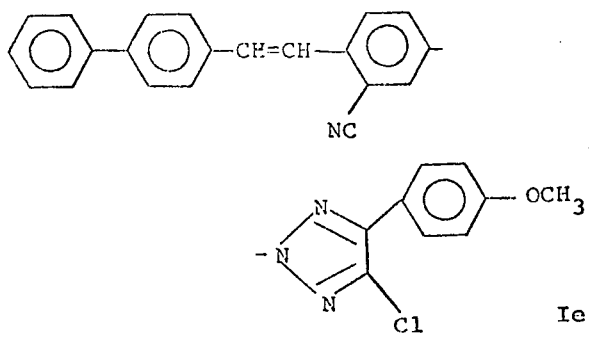

Ie

7. A compound according to claim 1, of the formula,

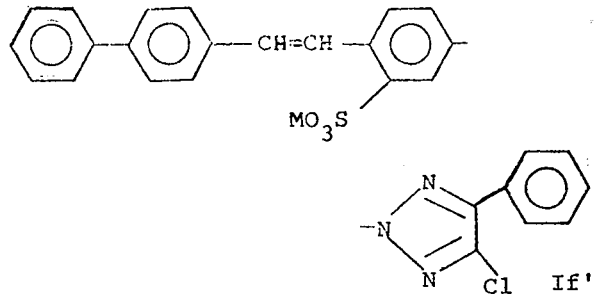

If' wherein M is as defined in claim 1.

8. A compound according to claim 1, of the formula,

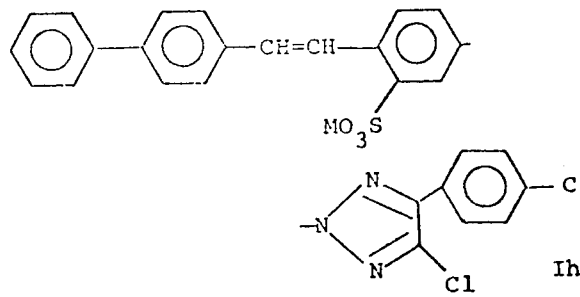

Ih' wherein M is as defined in claim 1.

9. A compound according to claim 1, of the formula,

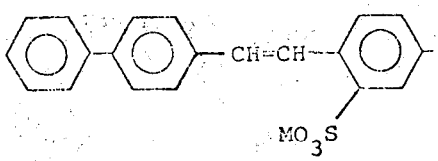

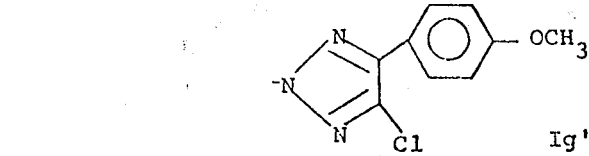

Ig' wherein M is as defined in claim 1.

10. A compound of the formula,

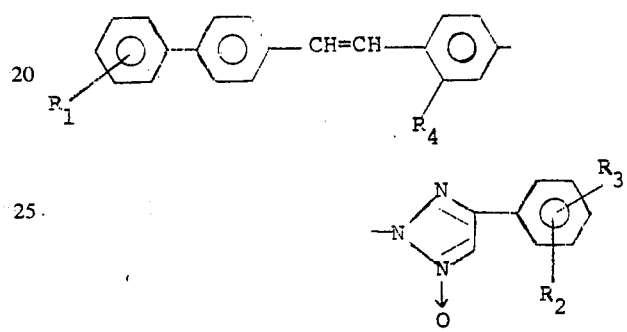

in which
R₁ signifies hydrogen, phenyl or the —SO₃M group, in which M signifies the equivalent of a cation,
R₂ signifies hydrogen; nitrile; fluorine; chlorine; alkyl or alkoxy of 1 to 5 carbon atoms which may be substituted by hydroxyl, alkoxy of 1 to 4 carbon atoms, phenyl or phenoxy; or —COOM or —SO₃M, in which M is as defined above; —CONR'R" or SO₂NR'R", in which R' and R" each signifies hydrogen or alkyl of 1 to 4 carbon atoms,
R₃ signifies hydrogen; nitrile; fluorine; chlorine; alkyl or alkoxy of 1 to 5 carbon atoms which may be substituted by hydroxyl, alkoxy with 1 to 4 carbon atoms, phenyl or phenoxy; or phenyl which may be substituted by fluorine, chlorine, alkyl or alkoxy of 1 to 5 carbon atoms, cyano or the —SO₃M group, in which M is as defined above; or —CONR'R" or —SO₂NR'R" in which R' and R" are as defined above, and
R₄ signifies hydrogen; nitrile; one of the groups —COOM or —SO₃M, in which M is as defined above; —CONR'R" or —SO₂NR'R", in which R' and R" are as defined above.

11. A compound according to claim 1 of the formula

12. A compound according to claim 10 of the formula

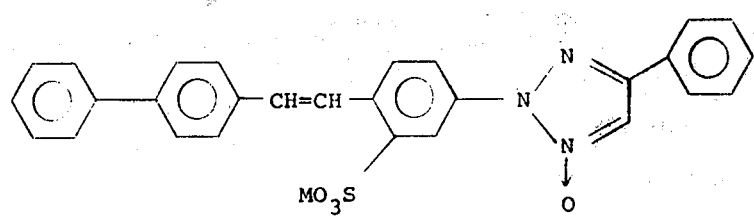
* * * * *